April 19, 1960
R. M. KENDIG
2,932,947
HYDRAULIC POWER BRAKE APPARATUS
Filed Dec. 26, 1957
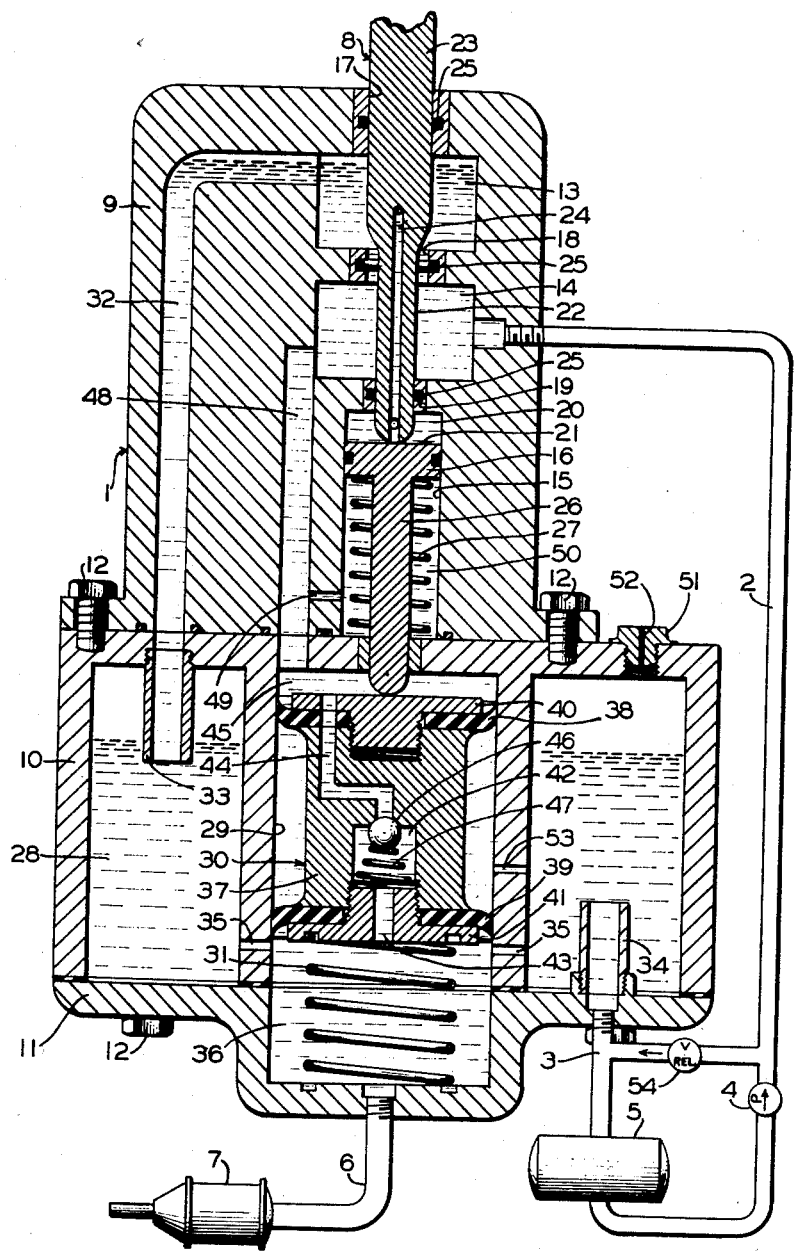
INVENTOR.
Robert M. Kendig
BY
Adelbert A. Steinmiller
Attorney

United States Patent Office 2,932,947
Patented Apr. 19, 1960

2,932,947
HYDRAULIC POWER BRAKE APPARATUS

Robert M. Kendig, Trafford, Pa., assignor to Westinghouse Air Brake Company, Wilmerding, Pa., a corporation of Pennsylvania Application December 26, 1957, Serial No. 705,267

4 Claims. (Cl. 60—52)

This invention relates to hydraulic power brake control valve apparatus and more particularly to a power brake control valve for use in hydraulic power brake apparatus of the type utilized on large trucks, truck trailers or similar vehicles.

In operation of large trucks and particularly those that are utilized for transporting heavy loads at fast speeds, it is often required to have heavy braking forces capable of braking these vehicles to the degree of maximum adhesion of the tires to the road surface. Several types of apparatus have been devised to attempt to meet these requirements, however, such equipments have been costly to construct and install with numerous controls and mechanisms capable of faults.

According to the invention, there is provided a simple, reliable power brake apparatus for large trucks or similar vehicles in which fluid under pressure is constantly circulated through a brake control valve when the brakes are released. When a brake application is initiated by movement of a foot pedal, a plurality of stems and pistons are positioned by foot-pedal-operated linkage to effect partial or complete closing of a passage in said control valve to restrict and prevent circulation of fluid under pressure through said valve and thereby cause a build-up of hydraulic pressure in a piston chamber, and via a check valve in the piston to the wheel brake cylinders of the vehicle. An additional degree of braking may be attained (by supplementing said pump pressure power braking) by increased foot-pedal movement of said stems to exert force on said piston to increase the hydraulic braking pressure.

It is an object of this invention, therefore, to provide power brake apparatus of relatively simple and inexpensive construction wherein the same foot pedal which controls a hydraulic braking force effected through a hydraulic pressure circulatory system is also operative to mechanically cause increased hydraulic braking pressure.

In the accompanying drawing, the single figure shows, partly in outline and partly in enlarged section, the improved power brake apparatus representing one embodiment of the invention.

Description

As shown in the drawing, the power brake apparatus comprises a control valve 1 connected by pipes 2 and 3 to a fluid pump 4 and a sump reservoir 5. Pump 4 may be suitably driven, in manner not shown, as through a belt drive from the crankshaft of the vehicle engine. A pipe 6 connects the control valve 1 to the brake cylinders for the wheels of the vehicle, represented herein by a single brake cylinder 7, for applying a braking force to a wheel or wheels to be braked. An operating rod or shaft 8 is mechanically connected by linkage (not shown) to a brake pedal (not shown) so as to be depressed downwardly (as viewed in the drawing) with downward movement of the said brake pedal and returned to the normal position, in which it is shown in the drawing, when no pressure is applied to the said brake pedal.

The control valve 1 comprises a sectionalized casing consisting of upper section 9, an intermediate section 10 and a lower section 11, joined together by suitable means such as machine screws 12 around the periphery of the sections 9 and 11 at convenient intervals.

Formed within the upper section 9 of the casing are two chambers 13 and 14 and a bore 15 in which a piston 16 operates. The pedal-operated shaft 8 passes through a sealed sleeve 17 in the casing to the chamber 13, thence through a sleeve 18 to chamber 14 and through chamber 14 and a sealed sleeve 19 to a piston chamber 20 formed at the upper side of piston 16, the end of said shaft 8 being adapted to contact the upper face 21 of the piston 16. The lower portion 22 of the shaft 8 is of reduced diameter corresponding to that of sleeve 19. The outer end 23 of the shaft 8 is of larger diameter corresponding to that of the sealed sleeves 17 and 18 and is slidable therethrough. A central passage 24 is formed, as by drilling, centrally through the reduced diameter portion 22 of the shaft 8 to constantly connect the chamber 13 and piston chamber 20.

A suitable gasket or O ring 25 is fitted in each of the sleeves 17, 18 and 19, such that the outer larger diameter end of the shaft 8 slides through the sleeves 17 and 18 with a fluid-tight contact, and the reduced diameter portion 22 of the shaft slides in the sleeve 19 with fluid-tight contact.

Connected to the outer extremity (not shown) of the shaft 8 is a suitable linkage and a foot pedal (not shown) operative in such a manner as to cause downward movement of the shaft 8 with application of pressure to said foot pedal to effect a brake application and return of the shaft 8 to its normal position (as shown) with release of pressure on said foot pedal to effect a brake release.

Connected to and extending downward within the bore 15 from the piston 16 is a piston stem 26 encircled by a spring 27 which biases the piston 16 and stem 26 upward.

Formed within the intermediate section 10 of the casing is an annular fluid storage chamber 28 encircling a cylindrical wall having therein a bore 29 in which operates an application piston 30 that is biased upwardly by a spring 31. A passage 32 in the upper casing section 9 connects chamber 13 in the upper section 9 to a port in the lower casing section wall opening into storage chamber 28. Previously mentioned pipe 3 connects the storage chamber 28 to the reservoir 5. The ends of both passage 32 and pipe 3 are connected to respective threaded protruding collars 33 and 34. The collar 33 extends downward into the fluid normally stored in chamber 28 to prevent agitation and emulsification of the fluid therein due to fluid under pressure entering via passage 32. The collar 34 extends upward into chamber 28 to a level above a plurality of ports 35 connecting chamber 28 to a piston chamber 36 formed below the piston 30, thereby causing chamber 36 to be constantly filled with liquid.

The piston 30 comprises a cylindrical piston body 37 having packing cups 38 and 39 secured at opposite ends thereof by threaded caps 40 and 41, screwed into the piston body. A chamber 42 is formed within the piston body 37. A passage 43 through the cap 41 establishes communication between chamber 42 and piston chamber 36. A passage 44 in the body and through cap 41 connects chamber 42 with a piston chamber 45, above the piston 30. A ball check valve 46 within chamber 42 biased by a spring 47 to a seated position closes the opening of passage 44 into chamber 42. A passage 48 connects piston chamber 45 to chamber 14 of the upper casing section 9. A radial port 49 in the wall of bore 15 connects passage 48 to a piston chamber 50 within the bore 15 at the lower side of piston 16.

A screw cap (or plug) 51 is provided in a threaded filing port in the top wall of casing section 10 through which fluid in the system may be replenished. Cap 51 is vented by a restricted passage 52 therethrough to prevent an air pressure build-up in the chamber 28, above the level of liquid therein.

A radial port 53 in the wall of bore 29 constantly connects the chamber 28 with the annular space formed between the outside of the piston body 37 and the wall of the bore 29 to prevent any pressure build-up in that space.

A high pressure relief valve 54 is connected between pipes 2 and 3 to provide means for circulating the fluid at high pressures during emergency applications.

Operation

In operation, the fluid pump 4 is operaed to maintain a constant flow of fluid from the reservoir 5 via pipe 2 to the chamber 14 and thence via passage 48 and port 49 to fill the chambers 45 and 50 as well as the passage 48 and the chamber 14. When the chamber 14 is filled, the fluid flows via the sleeve 18 past the reduced diameter portion 22 of the shaft 8 to chamber 13, and passage 32 to fill the storage chamber 28 and chamber 36 via ports 35. It can thus be seen, that with the shaft 8 in its raised or brake release position, in which it is shown, a continuous flow or circulation of fluid is maintained in a circuit including the reservoir 5, pump 4, pipe 2, chamber 14, chamber 13, passage 32, storage chamber 28 and pipe 3 back to the reservoir.

To make a brake application, the brake pedal (not shown) is depressed a degree sufficient to cause downward movement of the shaft 8 (by means of linkage not shown), to move the outer larger diameter end 23 of the shaft 8 toward the sleeve 18 and thereby restrict the previously described fluid flow circuit at the sleeve 18 in accordance with the degree of downward movement of shaft 8. Downward movement of the shaft 8, aside from restricting the sleeve 18, also transmits downward movement of the piston 16 and stem against the piston 30 to move the piston 30 downward such that the lower packing cup 39 closes off communication between chambers 36 and 28 via ports 35. During the downward movement of the shaft 8, the pump 4 continues to pump fluid into chamber 14, and due to the flow of fluid through the sleeve 18 into chamber 13 being restricted, a build-up of fluid pressure occurs in chamber 14, passage 48, chamber 50 and chamber 45 resulting in an increase of pressure in chamber 45. The just described increase in pressure in chamber 45 is transmitted via passage 44, past the ball check valve 46 to the chamber 36 to increase the pressure in chamber 36 and connected brake cylinder 7 to apply the brakes on the wheels of the vehicle in well-known manner.

It can thus be seen that the degree of brake application is dependent upon the pressure in chamber 36 which is dependent upon the pressure in chamber 45 which in turn is dependent upon the degree of restriction of flow through the sleeve 18. The build-up of pressure in chamber 45 does not effect downward movement of the piston 30 due to the pressure equalizing communication between chamber 45 and chamber 36 via passage 44. Positioning of the piston 30 is determined by the downward movement of the stem 26 in engagement with the piston 30 and in opposition to the forces exerted by springs 27 and 31. The ball check valve 46 prevents backflow of pressure from chamber 36 to chamber 45.

Any desired degree of braking may be attained by exerting the initial desired degree of foot-applied pressure through the linkage (not shown) to the shaft 8, to effect positioning of the piston 30 and restriction of fluid flow through the sleeve 18. Once this desired restriction is obtained, the fluid pressure in chamber 14 and connected chambers 45, 36 and 50 will build up to a degree determined by the amount of restriction at sleeve 18 and level off at said pressure until the amount of restriction at sleeve 18 is changed. Thus the foot pressure is necessary only to change the positioning of shaft 8 while the actual brake applicaion and maintaining is accomplished automatically by pump pressure.

Simultaneously with the build-up of pressure in chamber 45, the pressure of fluid in chamber 50 is correspondingly building up and acting against the lower face of the piston 16 in an upward direction against the foot pedal pressure (transmitted by the pedal linkage and the shaft 8) to thereby give the operator a sense of feel as to the degree of braking being applied, a sensation referred to as "feel" pressure. The passage 24 through the center of the shaft 8 prevents a build-up of pressure of the liquid trapped in chamber 20 by venting said chamber to chamber 13, thereby preventing any false sense of feel transmitted to the operator as in indication of the degree of braking applied.

If a large degree of braking is required, such as an emergency braking force, the foot pedal (not shown) is depressed a maximum degree thereby effecting downward movement of the shaft 8 to a maximum degree in which flow of fluid through sleeve 18 is completely interrupted. With the shaft 8 at its maximum downward position, the upper end of the passage 24 therethrough is moved into chamber 14, thereby permitting a build-up of fluid pressure in chamber 20 above the piston 16 to counteract against the so-called "feel" pressure of fluid in chamber 50. With the effect of "feel" pressure removed, the pressure applied by the operator's foot on the foot pedal to its maximum downward position is directly effective through piston 16 and stem 26 to effect sufficient downward movement of piston 30 to increase the pressure in chamber 36 and assist the pump-applied braking forces in applying the brakes, and therefore increasing the degree of brake application. With the circulation of fluid completely cut off in this emergency position of the shaft 8, the pressure of fluid in chamber 14 and connected chambers 20, 45, 50 and 36 will build up to the maximum allowable pressure of the pump 4 at which time a high pressure relief valve 54 will open to allow circulation of pressure the fluid at said high pressure to prevent damage to the pump.

It can thus be seen that the power brake apparatus may be operative not only as a power brake because of the pump 4 building up a fluid pressure in chamber 45 and chamber 36, but also as a combined power brake and foot-applied brake because of the foot-applied pressure transmitted directly to the piston 30 via the stem 26. The foot pressure exerted to effect power braking is of nominal degree, substantial foot pressure being required only for an emergency application.

To effect a brake release, the foot-applied pressure is removed from the foot pedal (not shown) to permit the combined efforts of the spring 31, spring 27 and any springs in the pedal linkage (not shown) to return the shaft to its upper position (as shown) and thereby reduce the restriction at sleeve 18 and relieve the fluid pressure in chambers 45 and 14 via the sleeve 18 to the chambers 13 and 28. With the release of fluid pressure in chamber 45, the spring 31 moves the piston 30 upward past the port 35 thereby releasing the brake-applying fluid pressure in chamber 36 and connected wheel brake cylinder 7 and effecting a brake release.

Having now described the invention, what I claim as new and desire to secure by Letters Patent is:

1. Vehicle power braking apparatus of the type comprising an hydraulic pressure circulatory system wherein brake fluid is circulated by a pump through a conduit back to a sump reservoir for recirculation, said apparatus comprising a control valve device comprising a casing having one chamber to which brake fluid is supplied by said pump, a second chamber from which brake fluid may flow back to the pump reservoir, valve means for controlling the rate of discharge of brake fluid from said one chamber to said second chamber to thereby cause establishment of a corresponding hydraulic pressure therein, a different chamber in said casing connectable through a port to said sump reservoir and through a conduit to all the brake cylinders of the vehicle, means responsive to initial movement of said valve means towards a position to reduce said rate of discharge from said one chamber to said second chamber and for closing said port between said different chamber and said sump reservoir, and passage means through which hydraulic pressure in said one chamber is communicated to said different chamber and the brake cylinder when said port is closed, a brake application being effected according to the pressure transmitted to all the brake cylinders from said different chamber.

2. A control valve device for use in an hydraulic power brake apparatus of the type including an hydraulic pressure circulatory system wherein brake fluid is circulated by a pump through a conduit back to a sump reservoir, said control valve device comprising a casing for interposition in the conduit of said system, which casing has a first chamber to which brake fluid may be supplied from the conduit, a second chamber in said casing from which brake fluid may flow back to the sump reservoir, means providing a port between said first and said second chambers, a valve element normally in a position permitting unrestricted flow of brake fluid from said first chamber to said second chamber and operative to progressively restrict the flow of brake fluid from said first chamber to said second chamber to thereby cause a corresponding degree of hydraulic pressure to be established in said first chamber, said casing including a cylinder, a piston operable therein having at one side a third chamber and at the opposite side a fourth chamber, said fourth chamber being connectable through a conduit to a brake cylinder, one-way check valve means for providing communication through said piston from the said third chamber to the said fourth chamber and preventing reverse flow of brake fluid from the fourth chamber to the third chamber, means providing communication between said first chamber and said third chamber whereby the hydraulic presure in said first chamber is transmitted to said third chamber and thence via said check valve means to said fourth chamber and said brake cylinder, port means normally connecting said fourth chamber and said sump reservoir, and means subject to the force exerted to move said valve element for moving said piston to close said port means, and thereby cause the hydraulic pressure established in said first chamber to be reflected in said fourth chamber and said brake cylinder the correspondingly established pressures being effective to cause a brake application.

3. A control valve device for use in an hydraulic power brake apparatus of the type including an hydraulic pressure circulatory system wherein brake fluid is circulated by a pump through a conduit back to a sump reservoir, said control valve device comprising a casing for interposition in the conduit of said system, which casing has a first chamber to which brake fluid may be supplied from the conduit, a second chamber in said casing from which brake fluid may flow back to the sump reservoir, means providing a port between said first and said second chambers, a valve element normally in a position permitting unrestricted flow of brake fluid from said first chamber to said second chamber and operative responsively to a manually applied force to progressively restrict the flow of brake fluid from said first chamber to said second chamber to thereby cause a corresponding degree of hydraulic pressure to be established in said first chamber, said casing including a cylinder, a piston operable therein having at one side a third chamber and at the opposite side a fourth chamber, one-way check valve means for providing communication through said piston from the said third chamber to the said fourth chamber and preventing reverse flow of brake fluid from the fourth chamber to the third chamber, passage means providing communication between said first chamber and said third chamber whereby the hydraulic pressure in said first chamber is transmitted to said third chamber and thence via said check valve means to said fourth chamber, a fifth chamber connectable to said passage means whereby the hydraulic pressure established in said first and third chamber is correspondingly established in said fifth chamber, port means normally connecting said fourth chamber and said sump reservoir, movable abutment means subject on one side to the manually applied force exerted to move said valve element to move said piston to close said port means and thereby cause the hydraulic pressure established in said first, third and fifth chambers to be reflected in said fourth chamber, and subject on the opposite side to a spring biasing force and the fluid pressure in said fifth chamber to cause the pressure in said fifth chamber to be effective on said valve element in opposition to said manually applied force, said fourth chamber being connectable to a brake cylinder wherein the correspondingly established pressures are effective to cause a brake application.

4. A control valve device for use in an hydraulic power brake apparatus of the type including an hydraulic pressure circulatory system wherein brake fluid is circulated by a pump through a conduit back to a sump reservoir, said control valve device comprising a casing for interposition in the conduit of said system, which casing has a first chamber to which brake fluid may be supplied from the conduit, a second chamber in said casing from which brake fluid may flow back to the sump reservoir, means providing a port between said first and said second chambers, a valve element normally in a position permitting unrestricted flow of brake fluid from said first chamber to said second chamber and operative responsively to a manually applied force to progressively restrict the flow of brake fluid from said first chamber to said second chamber to thereby cause a corresponding degree of hydraulic pressure to be established in said first chamber, said valve means having a stem with an elongated passage therethrough, said casing including a cylinder, a piston operable therein having at one side a third chamber and at the opposite side a fourth chamber, one-way check valve means for providing communication through said piston from the said third chamber to the said fourth chamber and preventing reverse flow of brake fluid from the fourth chamber to the third chamber, passage means providing communication between said first chamber and said third chamber whereby the hydraulic pressure in said first chamber is transmitted to said third chamber and thence via said check valve means to said fourth chamber, a fifth chamber connectable to said passage means whereby the hydraulic pressure established in said first and third chamber is correspondingly established in said fifth chamber, port means normally connecting said fourth chamber and said sump reservoir, movable abutment means subject normally on one side to the pressure in a sixth chamber normally connected to said second chamber via said elongated passage in said valve stem and to the manually applied force exerted to move said valve element to move said piston to close said port means whereby the hydraulic pressure established in said first, third and fifth chambers may be reflected in said fourth chamber, and subject on the opposite side to the fluid pressure in said fifth chamber whereby the fluid pressure in said fifth chamber is effective on said valve element in opposition to said manually applied force, said fourth chamber being connectable to said brake cylinder wherein the correspondingly established pressures are effective to cause a brake application, said sixth chamber being connectable via said elongated passage to said first chamber in an emergency position of said valve element and valve stem whereby the fluid pressures in said fifth chamber and said sixth chamber are equalized such that fluid pressure in said fifth chamber is not effecitve on said valve element and the manually applied force exerted to move said valve element is reflected in said fourth chamber.

References Cited in the file of this patent

UNITED STATES PATENTS

| | | |
|---|---|---|
| 1,960,996 | Guernsey | May 29, 1934 |
| 2,004,078 | McDougall | June 4, 1945 |

FOREIGN PATENTS

| | | |
|---|---|---|
| 835,760 | France | Oct. 3, 1938 |
| 753,839 | Germany | Aug. 9, 1954 |